US008668276B2

(12) United States Patent
Hall et al.

(10) Patent No.: US 8,668,276 B2
(45) Date of Patent: Mar. 11, 2014

(54) WHEEL ASSEMBLY HEAT SHIELD

(75) Inventors: John M. Hall, Uniontown, OH (US);
William J. Burley, Barberton, OH (US);
Mark P. Dyko, Copley, OH (US); Kurt Burkhalter, Akron, OH (US)

(73) Assignee: Meggitt Aircraft Braking Systems, Akron, OH (US)

( * ) Notice: Subject to any disclaimer, the term of this patent is extended or adjusted under 35 U.S.C. 154(b) by 346 days.

(21) Appl. No.: 13/182,889

(22) Filed: Jul. 14, 2011

(65) Prior Publication Data
US 2013/0015697 A1    Jan. 17, 2013

(51) Int. Cl.
*B64C 25/36* (2006.01)

(52) U.S. Cl.
USPC ............................................. 301/6.2; 301/6.1

(58) Field of Classification Search
CPC ...................................................... B64C 25/36
USPC ................. 301/6.1, 6.2, 6.91; 188/71.5, 71.6, 188/264 G; 244/103 R, 110 A, 110 H, 111
See application file for complete search history.

(56) References Cited

U.S. PATENT DOCUMENTS

| | | | | |
|---|---|---|---|---|
| 2,795,302 A | * | 6/1957 | Gaylord | 188/264 R |
| 3,051,528 A | * | 8/1962 | Rogers | 301/6.3 |
| 3,958,833 A | * | 5/1976 | Stanton | 301/6.2 |
| 4,017,123 A | * | 4/1977 | Horner et al. | 301/6.91 |
| 4,084,857 A | * | 4/1978 | VanderVeen | 301/6.2 |
| 4,621,715 A | * | 11/1986 | Denton | 188/264 R |
| 5,024,297 A | * | 6/1991 | Russell | 188/18 A |
| 5,236,249 A | * | 8/1993 | Han et al. | 301/6.91 |
| 5,851,056 A | * | 12/1998 | Hyde | 301/6.91 |
| 6,003,954 A | * | 12/1999 | Everhard et al. | 301/6.1 |
| 6,419,056 B1 | * | 7/2002 | Dyko et al. | 188/264 G |
| 6,637,574 B2 | * | 10/2003 | Landa et al. | 192/70.2 |
| 7,488,044 B2 | * | 2/2009 | Scelsi et al. | 301/6.2 |
| 7,546,910 B2 | * | 6/2009 | Thorp et al. | 188/71.6 |
| 2010/0025172 A1 | * | 2/2010 | Campbell | 188/264 AA |
| 2012/0241557 A1 | * | 9/2012 | Coty | 244/100 R |

* cited by examiner

*Primary Examiner* — Nicole Verley
(74) *Attorney, Agent, or Firm* — Renner, Kenner, Greive, Bobak, Taylor & Weber Co., L.P.A.

(57) ABSTRACT

A heat shield segment includes at least one tab extending from an outboard end, the tab adapted to secure the heat shield segment against radial and axial movement. The at least one tab is received over a retaining ring positioned within a tube well of a wheel. The retaining ring is received in recesses formed in the inner surface of drive keys spaced around the interior of the tube well. The heat shield segment is secured at the inboard end by a fastener, and is spaced from the tube well by a spacer positioned between the heat shield segment and the tube well. The at least one tab of the heat shield segment allows for easy assembly and maintenance of the heat shield assembly formed by a plurality of the heat shield segments.

16 Claims, 6 Drawing Sheets

WHEEL ASSEMBLY HEAT SHIELD

FIELD OF THE INVENTION

The present invention relates to a heat shield for a wheel and brake assembly. More particularly, the invention relates to a segmented heat shield and a support and retainer mechanism for securing the heat shield segments within an aircraft wheel in a manner that facilitates easy assembly and maintenance.

BACKGROUND OF THE INVENTION

Aircraft wheel assemblies typically include a heat shield positioned between the wheel and the discs of a brake assembly located within the wheel. The heat shield is provided to limit conduction and radiation heat transfer from the discs to the wheel assembly, as well as to prevent hot brake material created during braking from being forced outward against the inside of the wheel. Excessive temperatures in the wheel can cause damage and potentially failure of the wheel and/or tire, so the effectiveness and integrity of the heat shield is important. To that end, it is often necessary to perform maintenance on the heat shield in more frequent intervals than the remainder of the wheel and brake assembly. Heat shield maintenance may require replacing the heat shield, or a portion of it, if damaged or degraded during operational use or maintenance operations.

The wheel assembly often includes rotor drive keys, such as conventional beam keys or boss keys, circumferentially spaced around the interior of the wheel and oriented generally parallel to an axis of rotation of the wheel. The drive keys are spaced from the wheel and secured at both ends, and act as engagement and driving members for the rotating discs of the brake assembly. The drive keys may be spaced from the interior of the wheel to reduce conduction heat transfer from the brake to the wheel. In prior art heat shield assemblies, the heat shield may be secured to the drive keys, either directly or indirectly. In this way the heat shield segments are spaced from the wheel, thereby providing an air-filled insulation layer between the heat shield and the wheel. While this method of attachment is effective at limiting heat transfer to the wheel, prior art attachment mechanisms for securing the heat shield to the drive keys present several drawbacks, particularly with respect to routine maintenance of the heat shield.

One prior art approach includes a single piece heat shield secured between the wheel and drive keys. The heat shield is spaced from both the wheel and drive keys to minimize heat transfer between the brake and the wheel. Such a heat shield may be effective at reducing heat transfer to the wheel, but removing a damaged heat shield requires removing all of the drive keys, which results in added time and difficulty, and therefore added maintenance costs.

Other prior art heat shields, such as that disclosed in U.S. Pat. No. 5,002,342, are formed by a plurality of interleaved segments that allow for thermal cycling caused by temperature changes. The segments of the heat shield are individually removable from the wheel, but removal of a heat shield segment requires removal of the drive keys to which it is attached. Other prior art heat shields, such as those disclosed by U.S. Pat. Nos. 5,851,056 and 7,051,845, include heat shield segments disposed between adjacent drive keys and supported by heat shield carriers positioned over and extending the length of the drive keys. The heat shield segments of these heat shield assemblies can be removed individually from the wheel without removing any of the drive keys. However, the heat shield carriers and other supporting and anchoring mechanisms of these systems are complicated and have a relatively large number of parts, and may result in increased manufacturing and maintenance costs.

Thus, there is a need for an improved heat shield assembly that provides easy assembly and removal of heat shield segments.

SUMMARY OF THE INVENTION

In general, a heat shield segment according to the present invention includes at least one skin layer having a radius and adapted to be positioned within a tube well of a wheel; and at least one tab extending from said skin layer and adapted to secure said at least one skin layer to a retaining ring, said tab including an arm and a clip located at a distal end of said arm.

In accordance with at least one aspect of the present invention, a heat shield assembly includes a retaining ring removably positioned within a wheel; and a plurality of heat shield segments secured within the wheel, each of said heat shield segments including at least one skin layer and at least one tab extending therefrom and engaged with said retaining ring to secure an outboard end of said at least one skin layer against movement.

In accordance with at least one aspect of the present invention, an aircraft wheel assembly includes a wheel including a hub and a tube well positioned concentrically around said hub; a plurality of drive keys circumferentially spaced within said tube well and secured at opposing ends to said tube well; a retaining ring secured within said tube well and positioned concentrically around said hub and adjacent to an outboard end of said drive keys; and a plurality of radiused heat shield segments positioned between said drive keys, each of said heat shield segments including at least one tab extending from an outboard end and engaged with said retaining ring to secure said heat shield segment against movement.

BRIEF DESCRIPTION OF THE DRAWINGS

For a full understanding of the invention reference should be made to the following detailed description and the accompanying drawings, wherein.

DETAILED DESCRIPTION OF THE ILLUSTRATIVE EMBODIMENTS

Figure 1:
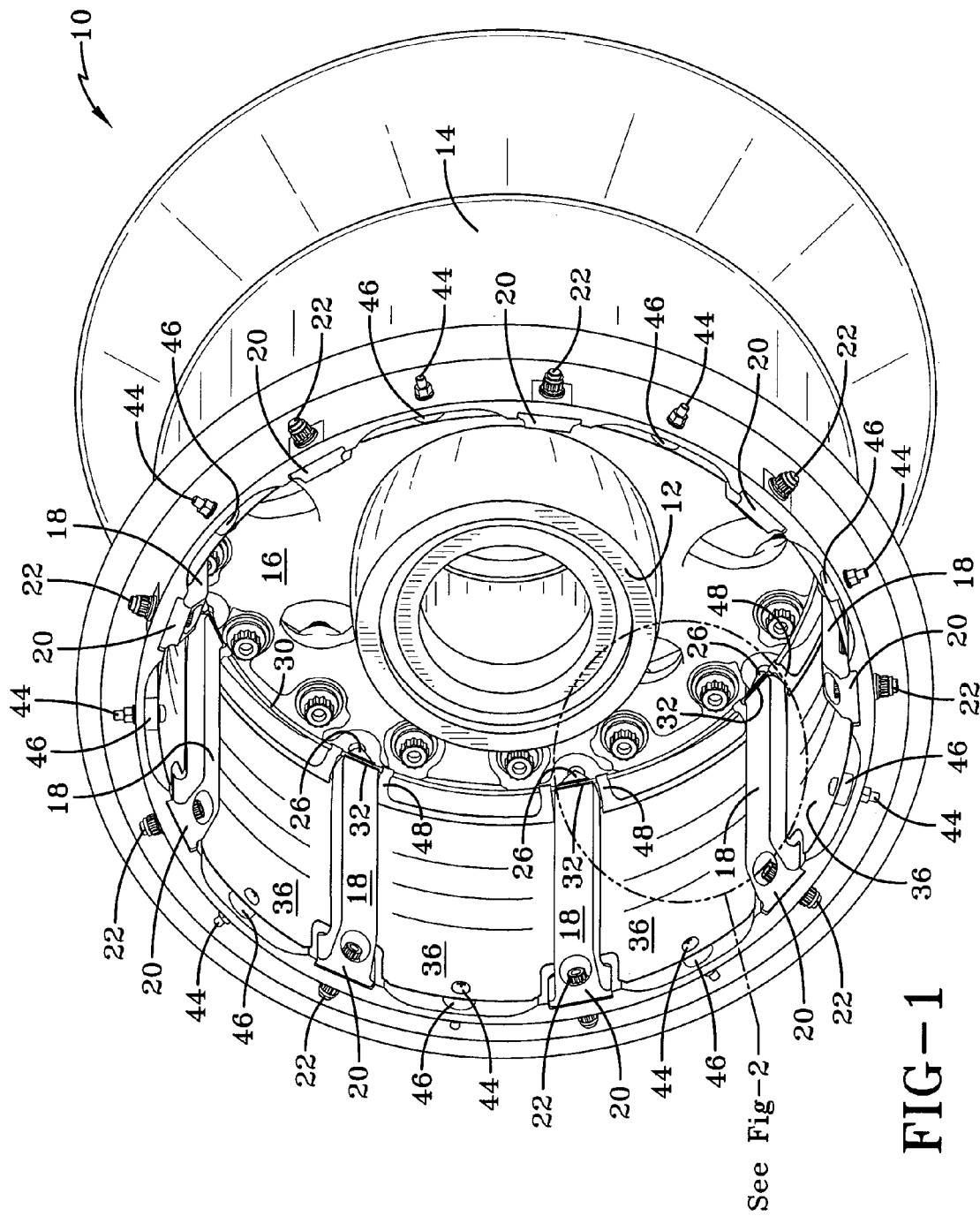
FIG. 1 is a perspective view of a wheel having a heat shield assembly according to the concepts of the present invention.

Referring now to FIGS. 1-6, an exemplary aircraft wheel is shown, and is generally indicated by the numeral 10. Wheel 10 is adapted to be mounted to an axle, and in particular, is adapted to be mounted to an aircraft axle. Wheel 10 includes a hub 12 having an axis of rotation 13 (FIG. 4), and a tube well 14 that is concentric with the hub 12. A web 16 extends between and connects the hub 12 to the tube well 14.

A brake assembly (not shown) is positioned concentrically around the hub 12 and within the tube well 14 when the wheel 10 is secured on the axle, as is known in the art. The brake assembly includes a disc stack having a plurality of alternating rotors and stators that, when compressed, generate friction and cause a braking force to act upon the wheel 10 through the rotors. The rotors are engaged with the drive keys, which are secured to the wheel as described in greater detail below. The rotors rotate with the wheel, and the stators are secured against rotation. Compression of the disc stack causes a slowing of the rotors due to frictional engagement with the stators, and thus a slowing of rotation of the wheel, as will be understood by those skilled in the art. The friction created between the stators and rotors during a braking event generates significant heat, which, if transferred to the wheel 10, may cause significant damage to the wheel or a tire carried by the wheel. The heat shield assembly of the invention is adapted to reduce radiation and conduction heat transfer from the brake assembly to the wheel 10.

A plurality of drive keys 18 are circumferentially spaced around the interior of the tube well 14 and are spaced radially inward toward the hub 12. Each drive key 18 is generally rectangular in cross section and extends substantially parallel to the axis of rotation 13. Any desired number of drive keys 18 may be provided and spaced around the interior of the tube well 14. In the embodiment depicted in the drawings, nine beam type drive keys 18 are secured to the interior of the tube well 14 and are spaced approximately 40° apart. Each of the drive keys 18 includes a foot 20 at an inboard end that extends radially outward toward the tube well 14. A fastener 22 extends radially through a recessed bore in foot 20 and an aligned bore in a flange 24 (FIG. 4) of tube well 14 to secure the drive key 18 to the wheel at the inboard end.

The outboard end 26 of each drive key 18 is received in a slot 28 (FIGS. 2 and 5) in wheel 10. Slot 28 is positioned radially inward of tube well 14 and is sized to receive the outboard end 26 of the drive key 18 to prevent any substantial movement of the outboard end 26 of the drive key 18 once inserted. The offset provided by foot 20 and the radially spaced location of slot 28 maintain each drive key 18 in a spaced relationship relative to tube well 14, with contact with the wheel 10 occurring only at the foot 20 and the outboard end 26. As discussed above, the rotors of the brake assembly are engaged with the drive keys 18 to cause rotation of the rotors with the wheel 10. The rotors may engage the drive keys 18 by any method or mechanism known to those skilled in the art, but in any case are in direct or indirect contact with the drive keys 18. Thus, the drive keys 18 would provide a significant source of conduction heat transfer between the brake assembly and the wheel 10 if not for the spaced relationship between the drive keys 18 and the tube well 14.

According to the concepts of the present invention, a retaining ring 30 is secured concentrically within tube well 14 and around hub 12. The retaining ring 30 is received in a recess 32 in the outboard end of each of the drive keys 18, and is thereby secured in place without a need for additional fasteners or other components. Recesses 32 may be in the form of a radiused depression in the drive key 18 so that the outer surface of the retaining ring 30 mates with the inner surfaces of the recesses 32. Once installed, the retaining ring 30 is prevented from axial and radial movement by the recesses 32 in drive keys 18. The retaining ring may be made of any suitable material such as, for example, stainless steel wire. In certain embodiments, the retaining ring 30 may possess sufficient elasticity to permit slight deformation during installation, thereby allowing the retaining ring 30 to be secured within the wheel 10 after the drive keys 18 have each been secured in place.

A heat shield segment 36 is secured within the radial space between adjacent drive keys 18. Thus, in the embodiment shown, nine heat shield segments 36 are positioned around the interior of the tube well 14. The heat shield segments 36 may be of any conventional construction, and may include a single skin layer or multiple spaced skin layers. For example, in a particular embodiment, each heat shield segment 36 may include an external skin layer and an internal skin layer spaced from one another to form an air-filled inner layer therebetween. The terms external and internal are used herein to refer to the positional relationship of the skin layers relative to the brake assembly, with the external skin layer being positioned radially outward of the internal skin layer. The external and internal skin layers may be connected at their peripheral edges, such as by welding, to form the heat shield segment 36.

The skin layers of the heat shield segments may be made of any suitable metals. In addition, the heat shield segments 36 may optionally include an inner layer positioned between the skin layers to improve the shielding and insulation characteristics of the heat shield segment 36. For example, a layer of ceramic material may be provided between the skin layers to improve the thermal resistance of the heat shield segments 36.

Each of the heat shield segments 36 is arcuate in nature so as to mirror the tube like shape of tube well 14. Accordingly, the heat shield segments 36 have a transverse radius approximately equal to, but slightly less than, the radius of tube well 14. When assembled in the wheel 10, the heat shield segments 36 form a barrier adjacent to the interior of the tube well 14. Each of the heat shield segments 36 has an axial length approximately equal to the axial length of the drive keys 18 so that substantially the entire tube well 14 is shielded from the brake assembly. In certain embodiments, the heat shield segments 36 may be sized so that adjacent heat shields overlap one another at the lateral edges. In other embodiments, the heat shield segments 36 may be sized so that the edges of adjacent heat shields are positioned proximate to one another.

The heat shield segments 36 are secured to the wheel 10 at an inboard end by a fastener 44. The fastener 44 is received in a hole in the heat shield segment 36 and an aligned hole in the flange 24 of the tube well 14. Fastener 44 is also received in a hole though a spacer 46 provided between the heat shield segment 36 and the tube well 14. Spacer 46 maintains a gap between the heat shield segment 36 and the tube well 14 of the wheel 10, thereby reducing conduction heat transfer to the wheel. Spacer 46 may be made of a non-metallic material, such as, for example, a ceramic material, to further reduce heat transfer to the wheel.

Figure 2:
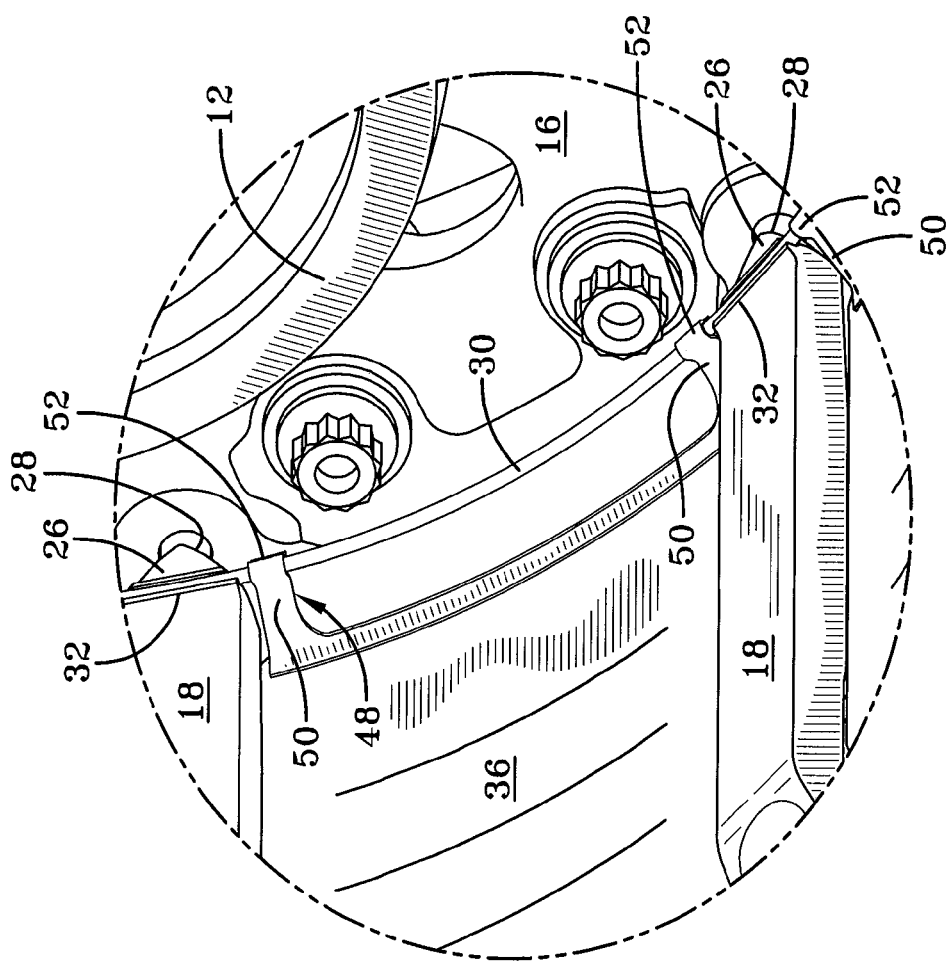
FIG. 2 is an enlarged view of a portion of the wheel and heat shield assembly of FIG. 1.
Figure 3:
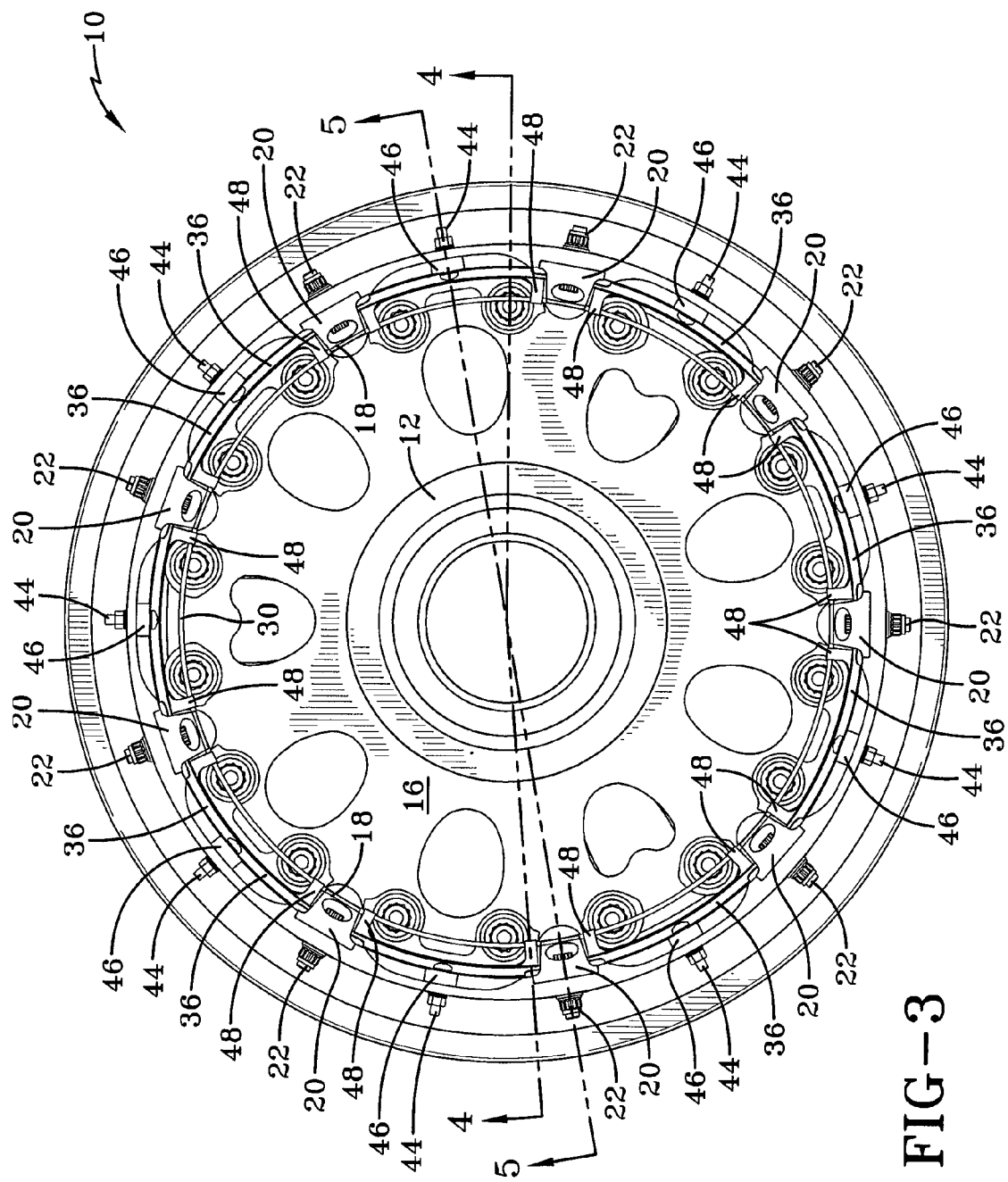
FIG. 3 is a side elevational view of the wheel and heat shield assembly of the present invention.
Figure 4:
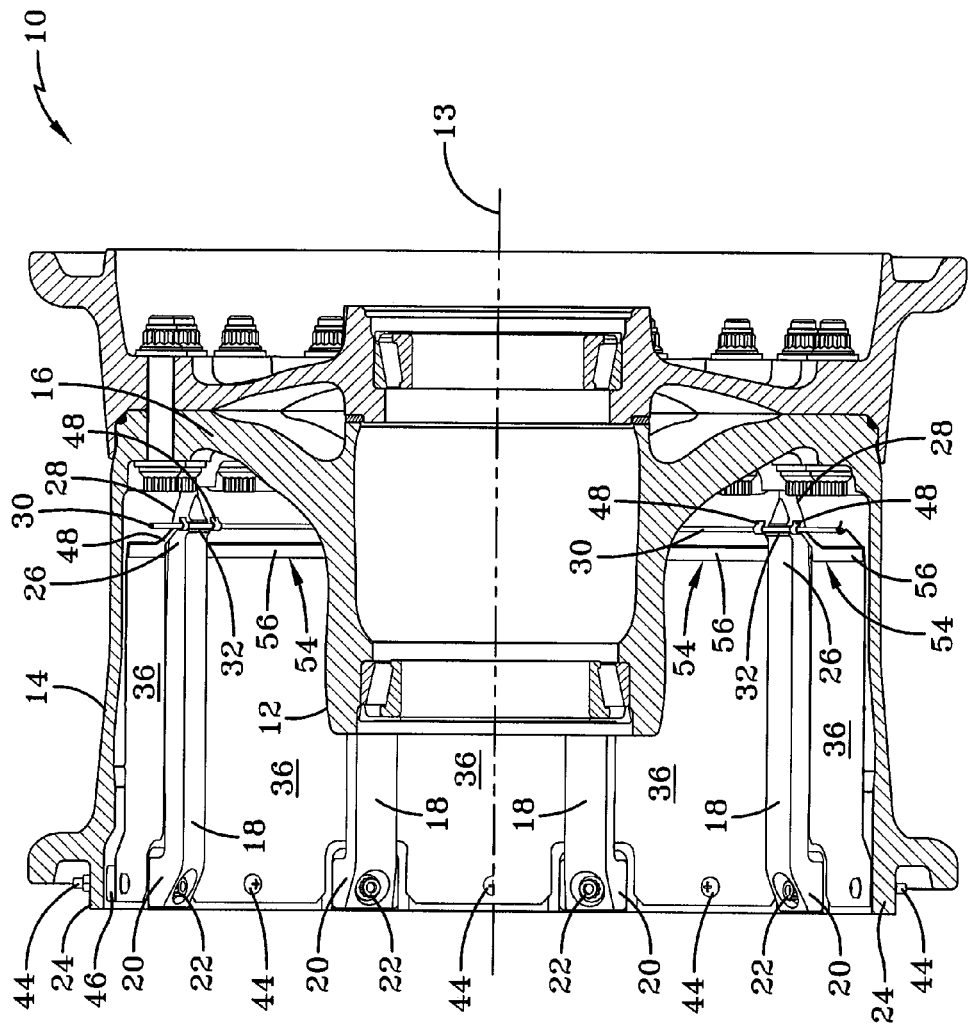
FIG. 4 is a sectional view of the wheel and heat shield assembly taken substantially along line 4-4 of FIG. 3.
Figure 5:
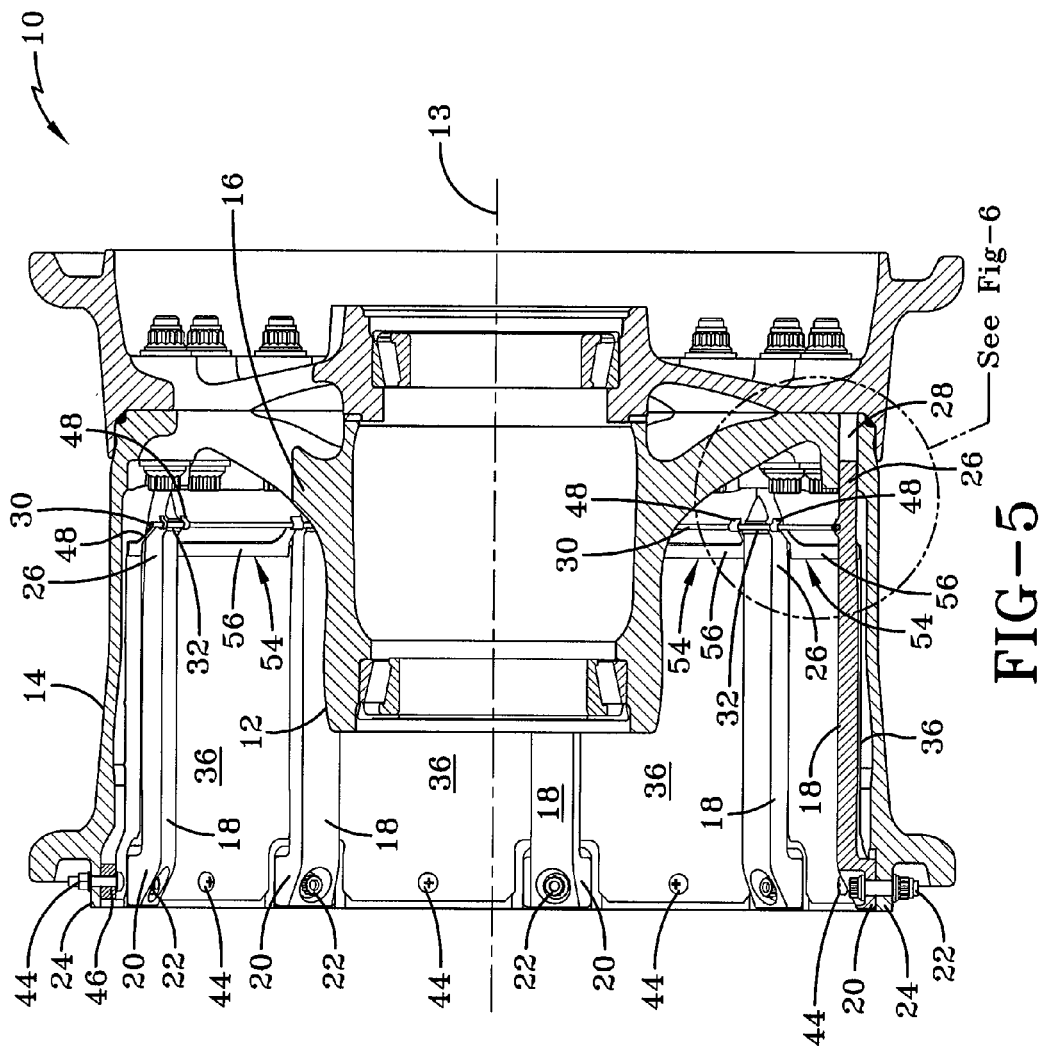
FIG. 5 is a sectional view of the wheel and heat shield assembly taken substantially along line 5-5 of FIG. 3.
Figure 6:
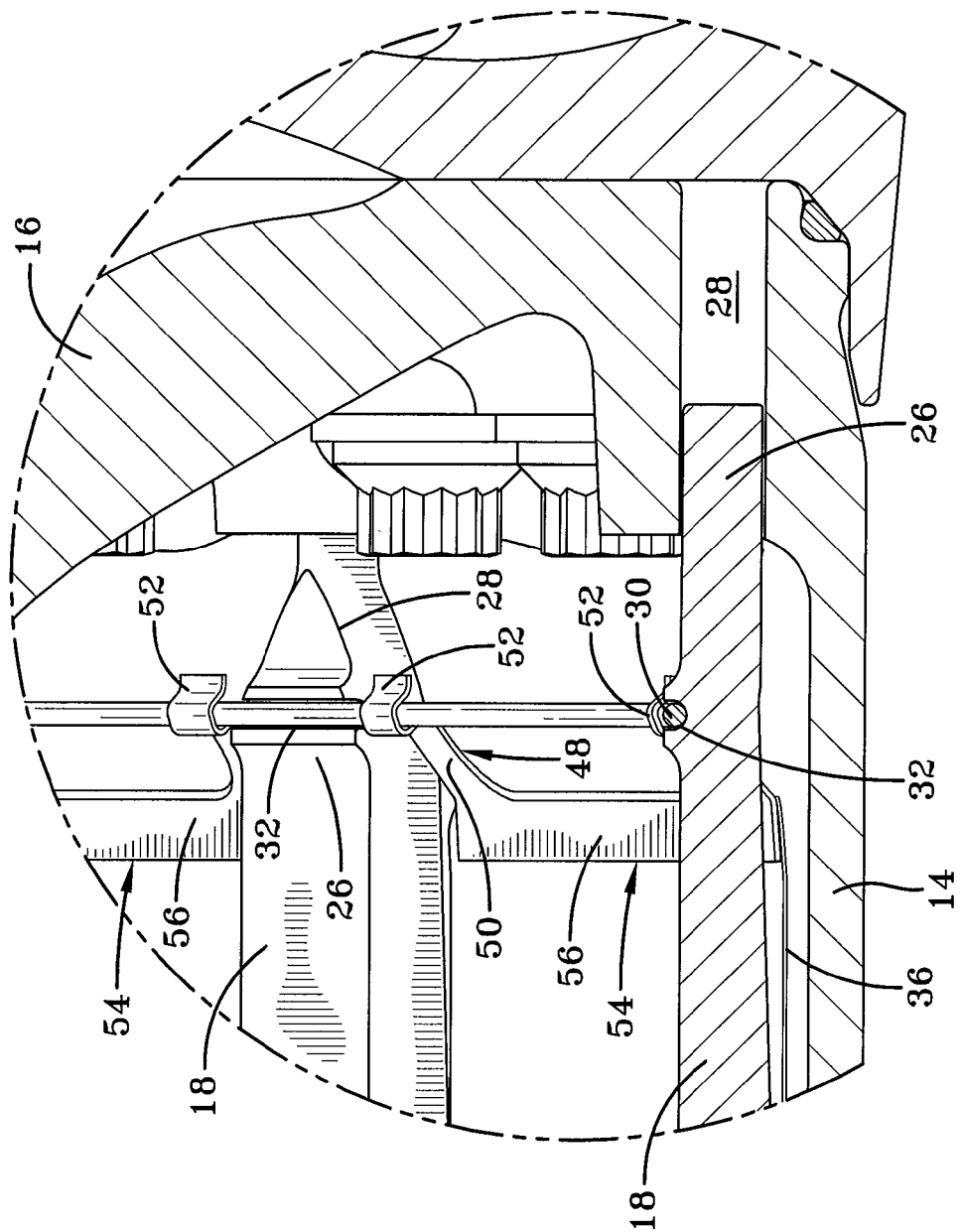
FIG. 6 is an enlarged sectional view of a portion of FIG. 5 showing a heat shield segment retaining mechanism according to the concepts of the present invention.

Each heat shield segment 36 is secured against radial and axial movement at the outboard end by a pair of tabs 48 extending from the heat shield segment 36 and secured over the retaining ring 30. Tabs 48 may be aligned with the outer surfaces of the adjacent drive keys 18 so that contact with the drive keys further restricts movement of the heat shield segment 36. Each tab 48 includes an arm 50 extending from the heat shield segment 36 axially outwardly and radially inwardly, and a clip 52 at a distal end of the arm 50 and spaced from the heat shield segment 36 (FIGS. 2 and 6). The clip 52 is adapted to be received over the retaining ring 30. For example, clip 52, as shown in the drawings, has a hook shape with an opening facing radially outward to receive the retaining ring 30 therein. The length of arm 50, and the displacement of clip 52, is designed to maintain a space or gap between the outboard end of the heat shield segment 36 and the tube well 14 approximately equal to the gap at the inboard end.

In certain embodiments, tabs 48 may be formed integrally with the heat shield segment 36. In other embodiments, and as shown in the Figures, tabs 48 may be formed as part of a heat shield retainer 54. The heat shield retainer 54 includes the laterally spaced tabs 48 and a connecting rib 56 extending between the tabs 48. The connecting rib 56 is radiused to conform to the shape of the heat shield segment 36 and is secured thereto, such as by spot welding. In certain embodiments, the tabs 48 and connecting rib 56 may be made of stainless steel or other suitable metals.

As will be appreciated by those skilled in the art from the above description, a heat shield assembly as described provides the desired reduction in heat transfer to the wheel 10 during a braking event, while also allowing for easy assembly and maintenance of the heat shield. A single heat shield segment 36 may be removed from wheel 10 by removing a single fastener 44 and releasing tabs 48 from retaining ring 30. Tabs 48 secure the outboard end of the heat shield segment 36 against radial movement without the need for additional fasteners or other complicated attachment mechanisms. In addition, retaining ring 30 may be easily assembled in the recesses 32 in drive keys 18 without a need for additional fasteners or attachment mechanisms.

It is thus evident that heat shield constructed as described herein substantially improves the art. In accordance with the Patent Statutes, only the best mode and preferred embodiment have been presented and described in detail. The invention should not be limited by the drawings or the description provided herein. For an appreciation of the true scope and breadth of the invention, reference should be made only to the following claims.

The invention claimed is:

1. A heat shield assembly comprising:
a retaining ring removably positioned within a wheel; and
a plurality of heat shield segments secured within the wheel, each of said heat shield segments including at least one skin layer and at least two spaced tabs extending therefrom and engaged with said retaining ring to secure an outboard end of said at least one skin layer against movement, each of said tabs including an arm extending from said outboard end of said skin layer and a clip portion at a distal end of said arm, said clip portion being removably secured to said retaining ring.

2. The heat shield assembly of claim 1, where said plurality of heat shield segments have a radius and are positioned adjacent to one another to form a tube like shield within a wheel.

3. The heat shield assembly of claim 2, where said retaining ring has a radius that is less than a radius of the tube like shield formed by said plurality of heat shield segments.

4. The heat shield assembly of claim 1, where said spaced tabs on each heat shield segment extend from a connecting rib that is secured to said at least one skin layer.

5. The heat shield assembly of claim 4, where said connecting rib is radiused to conform to said at least one skin layer.

6. The heat shield assembly of claim 1, where an inboard end of said heat shield segment is secured against movement by a fastener.

7. An aircraft wheel assembly comprising:
a wheel including a hub and a tube well positioned concentrically around said hub;
a plurality of beam keys circumferentially spaced within said tube well and secured at opposing ends to said tube well;
a retaining ring secured within said tube well and positioned concentrically around said hub and adjacent to an outboard end of said beam keys; and
a plurality of radiused heat shield segments positioned between said beam keys, each of said heat shield segments including at least one tab extending from an outboard end and engaged with said retaining ring to secure said heat shield segment against movement.

8. The wheel assembly of claim 7, where said retaining ring is received in recesses in the outboard end of said beam keys, said recesses acting to secure said retaining ring within said tube well.

9. The wheel assembly of claim 7, where each of said plurality of heat shield segments includes a pair of spaced tabs extending therefrom.

10. The wheel assembly of claim 9, where said tabs each include an arm extending from said heat shield segment and a clip portion at a distal end of said arm, said clip portion being removably secured to said retaining ring.

11. The wheel assembly of claim 9, where said spaced tabs extend from a radiused connecting rib secured to said heat shield segment.

12. The wheel assembly of claim 7, where said retaining ring is positioned radially inward of said tube well, and said outboard end of said radiused heat shield segments are spaced from said tube well.

13. The wheel assembly of claim 7, where said plurality of radiused heat shield segments are secured at an inboard end by a fastener and are spaced from said tube well be a spacer.

14. The wheel assembly of claim 7, where an outboard end of each of said beam keys is received in a slot in said wheel, said slot being spaced radially inward from said tube well.

15. The wheel assembly of claim 7, where an inboard end of each of said beam keys includes a foot extending radially outward, and where a fastener is received through said foot and said tube well to secure the inboard end to said tube well.

16. A heat shield assembly comprising:
a retaining ring removably positioned within a wheel;
a plurality of heat shield segments secured within the wheel, each of said heat shield segments including at least one skin layer and at least one tab extending therefrom and engaged with said retaining ring to secure an outboard end of said at least one skin layer against movement; and
wherein said plurality of heat shield segments have a radius and are positioned adjacent to one another to form a tube-like shield within a wheel and said retaining ring has a radius that is less than a radius of the tube-like shield formed by said plurality of heat shield segments.

* * * * *